(12) United States Patent
Shanahan et al.

(10) Patent No.: US 7,637,169 B2
(45) Date of Patent: Dec. 29, 2009

(54) FLANGELESS MAGNETIC FLOWMETER WITH INTEGRATED RETENTION COLLAR, VALVE SEAT AND LINER PROTECTOR

(75) Inventors: Bret Allen Shanahan, Chanhassen, MN (US); Nelson Mauricio Morales, Lakeville, MN (US)

(73) Assignee: Rosemount, Inc., Eden Prairie, MN (US)

( * ) Notice: Subject to any disclaimer, the term of this patent is extended or adjusted under 35 U.S.C. 154(b) by 0 days.

(21) Appl. No.: 12/082,456

(22) Filed: Apr. 11, 2008

(65) Prior Publication Data
US 2009/0188327 A1   Jul. 30, 2009

Related U.S. Application Data

(60) Provisional application No. 61/023,742, filed on Jan. 25, 2008.

(51) Int. Cl.
G01F 1/56 (2006.01)
(52) U.S. Cl. .................................... 73/861.08
(58) Field of Classification Search ............. 73/861.12, 73/861.08, 861.11–15
See application file for complete search history.

(56) References Cited

U.S. PATENT DOCUMENTS

| 715,127 | A | 12/1902 | Norton |
|---|---|---|---|
| 1,216,071 | A | 2/1917 | Carstensen |
| 1,271,542 | A | 7/1918 | Grenshaw |
| 1,707,969 | A | 4/1929 | Paulson |
| 2,180,691 | A | 11/1939 | Oliver |
| 2,667,297 | A | 1/1954 | McReary |
| 2,721,022 | A | 10/1955 | Billerbeck |
| 2,797,039 | A | 6/1957 | Belsinger |
| 3,015,430 | A | 1/1962 | Bauer |
| 3,058,583 | A | 10/1962 | Williams |
| 3,410,476 | A | 11/1968 | Buttery |
| 3,441,193 | A | 4/1969 | Castle |
| 3,603,501 | A | 9/1971 | Confer |
| 3,638,853 | A | 2/1972 | Perry |

(Continued)

FOREIGN PATENT DOCUMENTS

CH   6604345   4/1987

(Continued)

OTHER PUBLICATIONS

Specification Drawings, Special; Rosemount Inc., dated Jan. 19, 2007.

(Continued)

*Primary Examiner*—Jewel Thompson
(74) *Attorney, Agent, or Firm*—Kinney & Lange, P.A.

(57) ABSTRACT

A magnetic flowmeter comprises a pipe section, an insulating liner, a flangeless retention collar, a liner protector, a coil and an electromotive force sensor. The insulating liner lines the pipe section to form a process flow channel. The flangeless retention collar is located on an end of the pipe section for forming an end-to-end fluid connection to the process flow channel, and the liner protector is formed on the retention collar to provide an end seal for the insulating liner. The coil produces a magnetic field within the process flow channel, and the electromotive force sensor senses an electromotive force generated in fluid flow through the process flow channel.

25 Claims, 5 Drawing Sheets

U.S. PATENT DOCUMENTS

| | | | |
|---|---|---|---|
| 3,712,531 A | 1/1973 | McCall | |
| 3,797,728 A | 3/1974 | Buttery et al. | |
| 3,831,834 A | 8/1974 | Elward | |
| 3,858,720 A | 1/1975 | Flagler | |
| 3,863,834 A | 2/1975 | Sandford | |
| 4,008,849 A | 2/1977 | Baber | |
| 4,214,477 A * | 7/1980 | Schmoock | 73/861.12 |
| 4,345,464 A * | 8/1982 | Herzl et al. | 73/201 |
| 4,361,236 A | 11/1982 | Lavery | |
| 4,470,309 A * | 9/1984 | Wada | 73/861.12 |
| 4,497,212 A * | 2/1985 | Schmoock | 73/861.12 |
| 4,512,477 A | 4/1985 | Densen | |
| 4,583,679 A | 4/1986 | Johnson | |
| 4,727,755 A * | 3/1988 | Schmoock | 73/861.12 |
| 4,753,348 A | 6/1988 | Patrick et al. | |
| 4,834,242 A | 5/1989 | Selack et al. | |
| 4,844,262 A | 7/1989 | Patrick et al. | |
| 4,858,414 A | 8/1989 | Meschi | |
| 4,871,067 A | 10/1989 | Valenti | |
| 4,925,019 A | 5/1990 | Ganz et al. | |
| 4,951,824 A | 8/1990 | Kuchenbecker et al. | |
| 4,955,925 A | 9/1990 | Platti | |
| 4,964,511 A | 10/1990 | Meschi | |
| 5,036,982 A | 8/1991 | Aston | |
| 5,176,313 A | 1/1993 | Curry et al. | |
| 5,259,631 A | 11/1993 | Brande | |
| 5,325,989 A | 7/1994 | Karalus | |
| 5,348,147 A | 9/1994 | Gottfreid | |
| 5,413,273 A | 5/1995 | Money | |
| 5,487,506 A | 1/1996 | Drummond et al. | |
| 5,526,698 A * | 6/1996 | Sakurai et al. | 73/861.12 |
| 5,794,770 A | 8/1998 | Plomgren et al. | |
| 5,988,370 A | 11/1999 | Roemer et al. | |
| 6,227,444 B1 | 5/2001 | Makoesky et al. | |
| 6,352,157 B1 | 3/2002 | Srinvasan | |
| 6,422,454 B1 | 7/2002 | Barr | |
| 6,578,736 B2 | 6/2003 | Spivey | |
| 6,715,639 B2 | 4/2004 | Spivey | |
| 6,789,673 B2 | 9/2004 | Lingamfelte | |
| 6,964,520 B1 | 11/2005 | Sakai et al. | |
| 7,140,493 B2 | 11/2006 | Fry | |
| 2007/0283766 A1 * | 12/2007 | Ishikawa | 73/861.11 |

FOREIGN PATENT DOCUMENTS

| | | |
|---|---|---|
| DE | 19918991 | 11/2000 |
| EP | 0235852 | 3/1991 |
| EP | 0844188 | 5/1998 |
| EP | 1170221 | 9/2002 |
| FR | 1227491 | 8/1960 |
| GB | 1545469 | 5/1979 |
| WO | WO 2006-060703 | 6/2006 |

OTHER PUBLICATIONS

Official Search Report and Written Opinion of the Patent Cooperation Treaty in counterpart foreign Application No. PCT/US09/00297, filed Jan. 22, 2009.

* cited by examiner

FLANGELESS MAGNETIC FLOWMETER WITH INTEGRATED RETENTION COLLAR, VALVE SEAT AND LINER PROTECTOR

CROSS-REFERENCE TO RELATED APPLICATION

This application claims priority from Provisional U.S. Patent Application Ser. No. 61/023,742, entitled FLANGELESS MAGNETIC FLOWMETER WITH INTEGRATED LINER PROTECTOR, by Bret Shanahan et al., filed Jan. 25, 2008.

BACKGROUND

This invention relates generally to field devices for process measurement and control. Specifically, the invention concerns a magnetic flowmeter with a flangeless process coupling and integrated liner protector.

Field devices include a broad range of process management devices designed to measure and control process parameters such as pressure, temperature and flow rate. These devices have broad utility in a variety of industries, including manufacturing, hydrocarbon processing, hydraulic fracturing and other liquid hydrocarbon extraction techniques, bulk fluid handling, food and beverage preparation, water and air distribution, environmental control, and precision manufacturing applications for glues, resins, thin films, and thermoplastics.

Field devices include transmitters, which are configured to measure or sense process parameters, and controllers, which are configured to modify or control such parameters in order to achieve a target value. Sensor modules also include temperature sensors, pressure transducers, PH sensors, level sensors, and a variety of other devices for characterizing additional process variables and process fluid parameters. More generalized field devices include multi-sensor transmitters such as pressure/temperature transmitters and integrated controllers with both sensor and control functionality. These generalized devices include integrated flow controllers and hydrostatic tank gauge systems, which measure and regulate a number of related process pressures, temperatures, fluid levels and flow rates.

Flowmeters and associated transmitters fill a particularly important role in fluid processing, and they employ a wide variety of different technologies. These include, but are not limited to, turbine flowmeters that characterize flow as a function of mechanical rotation, differential pressure sensors that characterize flow as a function of pressure, mass flowmeters that characterize flow as a function of thermal conductivity, and vortex or Coriolis flowmeters that characterize flow as a function of vibrational effects.

Magnetic flowmeters distinguish from other flow measurement technologies in that they characterize flow via Faraday's Law, which depends upon electromagnetic interactions rather than mechanical or thermodynamic effects. In particular, magnetic flowmeters rely upon the conductivity of the process fluid, such as water containing ions, and the electromotive force induced across the fluid as it flows through a region of magnetic field.

Magnetic flowmeters provide substantial advantages in "dirty" (erosive and corrosive) fluid applications, or under flow conditions in which mechanical and restricted-flow technologies produce an unacceptable pressure drop. Because magnetic flowmeters depend upon electromagnetic induction, however, they also pose a number of engineering design challenges. These include the need for electrically insulating protective liners and specialized flange coupling hardware, which can increase costs and decrease service lifetime. There is thus a continuing need for improved magnetic flowmeter designs. In particular, there is a need for improved process coupling structures that can decrease installation time and maintenance requirements, and more durable liner designs that can increase service life.

SUMMARY

This invention concerns a body for a flangeless magnetic flowmeter. The flowmeter body comprises a pipe section, a liner, a retention collar and a liner protector. The pipe section extends through the flowmeter body and the liner lines the pipe section to form an insulated process flow channel. The retention collar is located on an end of the pipe section, in order to form an end-to-end fluid connection to the process flow channel. The liner protector is formed onto the retention collar, to provide an end seal for the insulating liner.

DETAILED DESCRIPTION

Figure 1:
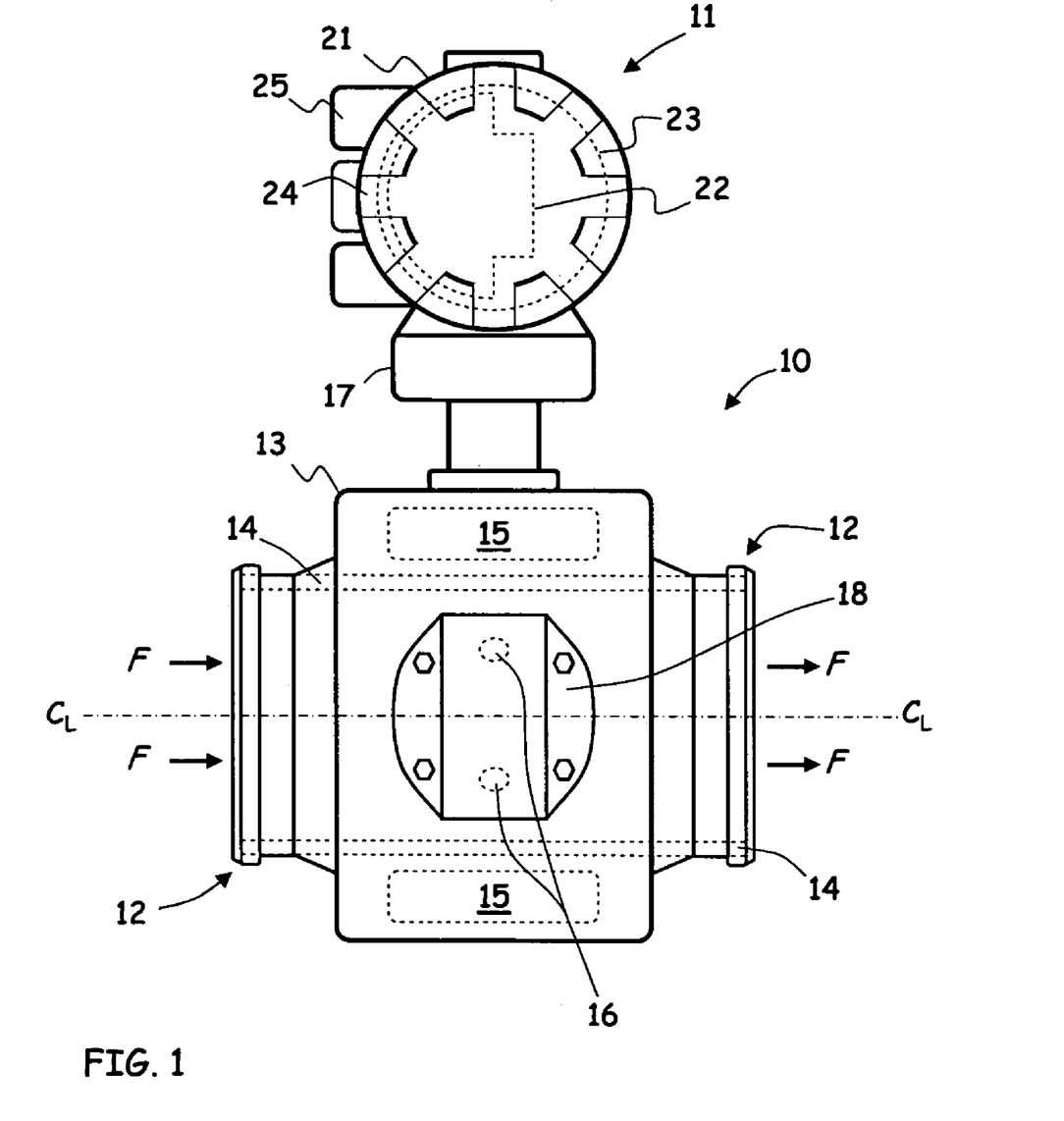
FIG. 1 is a schematic side view of a magnetic flowmeter with an integrated transmitter and flangeless process coupling structure.

FIG. 1 is a schematic side view of magnetic flowmeter 10 with integrated transmitter 11 and flangeless process coupling 12. Magnetic flowmeter 10 comprises flowmeter body 13 and pipe section 14, which couples to a process flow via flangeless process coupling 12. Transmitter 11 comprises housing assembly 21 with terminal block 22 and electronics/LOI (local operator interface) assembly 23 (both shown in hidden lines).

Flowmeter body (or meter body) 13 is formed of a durable material with mechanical strength, such as steel, aluminum or a suitable metal alloy, or a durable polymer such as PVC (polyvinyl chloride) or ABS (acrylonitrile butadiene styrene) plastic. Flowmeter body 13 is coaxially oriented about pipe section 14 along axial centerline $C_L$, forming a generally cylindrical housing around coils 15 and probe 16.

Figure 2:
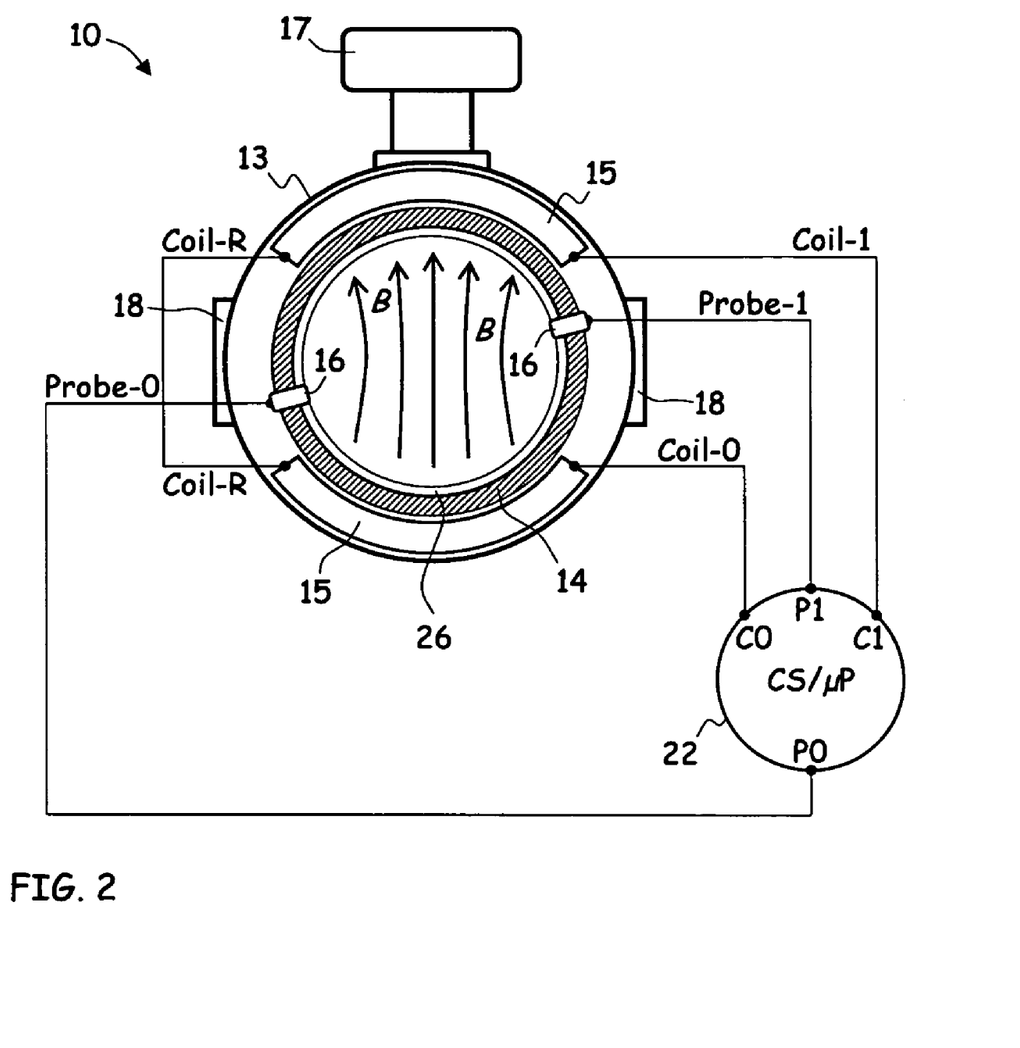
FIG. 2 is a schematic end view of the magnetic flowmeter in FIG. 1.

Flowmeter body 13 also provides transmitter mount 17 for transmitter 11 and probe cover 18 to cover probe 16. Note that only one probe cover 18 is shown in FIG. 1; typically, probe 16 comprises two probe electrodes, one on each side of pipe section 14, each with its own cover as shown in FIG. 2, below.

Pipe section 14 is manufactured of a durable, machinable material such as steel, stainless steel, copper, aluminum, or a metal alloy. In alternate embodiments, pipe section 14 is formed of a durable polymer material such as ABS, PVC or a durable plastic.

Pipe section 14 (shown with hidden lines) provides a process flow channel or process flow conduit for process flow F through magnetic flowmeter 10. In one embodiment, pipe section 14 comprises a circular pipe section with an inside diameter of approximately eight inches (8", or about 20 cm). In other embodiments the diameter of pipe section 14 varies. Alternatively, pipe section 14 has an oval, rectangular or other non-circular cross section. Pipe section 14 is also provided with a liner, as described below with respect to FIGS. 2 and 3.

In typical embodiments, flangeless process 12 coupling is comprised of the same material (that is, material with a substantially same composition) as pipe section 14. In alternate embodiments, flangeless process coupling 12 utilizes additional components manufactured from other materials, including, but not limited to, other metals, other metal alloys, and other durable polymer materials.

Process coupling 12 is a flangeless structure formed onto pipe section 14 by a combination of machining, welding, and other mechanical processes. Coupling structure 12 is thus located on an end of the process flow channel, to provide flangeless mounting and retention elements that form an end-to-end or "straight pipe" connection between magnetic flowmeter 10 and a fluid processing system.

Flangeless process coupling 12, flowmeter body 13 and pipe section 14 are typically formed of nonmagnetic materials. This prevents distortion of the field generated by coils 15, and allows the field to cross pipe section 14 relatively undisturbed. In some embodiments, flowmeter body 13 also comprises magnetically soft flux return components, external to pipe section 14, to increase the magnetic field strength, improve uniformity, and reduce fringing fields outside flowmeter 10.

In operation of magnetic flowmeter 10, a conducting process fluid such as an ionic water solution flows through pipe section 14 via the process flow channel. Magnetic coils 15 generate a magnetic field inside the pipe section, which induces an electromotive force (EMF, or voltage) across the conducting flow (that is, across probe electrodes 16 and the process flow channel). The induced voltage is a function of the flow rate and magnetic field strength. Transmitter 11 provides the current required to energize coils 15, and processes the voltage signal from electrodes 16 in order to measure or otherwise determine the process flow rate.

Housing assembly 21 for transmitter 11 is manufactured of a durable material such as metal or a durable plastic, or a combination of such materials. Housing assembly 21 comprises internal process couplings to secure internal transmitter components including terminal block 22 and electronics/LOI assembly 23. Housing assembly 21 also insulates the internal transmitter components, shields from adverse environmental conditions such as moisture and corrosive or explosive agents, and protects from contact with process machinery, tools, falling objects, and other potential hazards.

In some embodiments, housing assembly 21 comprises removable housing cover (terminal block cover) 24 to seal housing assembly 21 and to provide access to terminal block 22, as well as a number of conduit connections 25. In these embodiments, housing assembly 21 also typically comprises a removable electronics/LOI (local operator interface) cover on the far side of transmitter 11 (not shown in FIG. 1), to seal housing assembly 21 and to provide visual or mechanical access to electronics/LOI assembly 23.

In the integrated transmitter embodiment of FIG. 1, transmitter 11 is directly mounted to flowmeter 10 via transmitter mount 17. In alternate remote transmitter embodiments, transmitter 11 is remotely located up to one thousand feet (1,000', or about 300 m) from the flowmeter body, and is usually attached to another structure such as a flow pipe, structural support, or instrument bracket. In these embodiments, electrical connections to the transmitter are provided via cables, wires, a control bus or other means of electrical connection, with connections at transmitter mount 17 or another location on magnetic flowmeter 10.

Terminal block 22 typically comprises a terminal block body made of a durable plastic or other insulating material, and a number of conducting terminal connections. In particular, terminal block 16 provides power connections for transmitter 11, and I/O connections to a loop wire, control bus, or other means of communication with a process control system.

Electronics/LOI assembly 23 comprises at least one of a number of different circuit elements including, but not limited to, a controller or microprocessor for controlling transmitter 11 and magnetic flowmeter 10, a signal processor for processing voltage signals from probe 16, a current or voltage source for energizing coils 15, an I/O (input/output) interface for communicating between transmitter 11 and a process control system, and a local operator interface (LOI) for communicating with a local operator. Typically, the control, signal processing and I/O components of electronics assembly 23 are arranged into an electronics stack of two, three or more circuit boards, while the LOI functions are performed by a separate LOI assembly.

Communications between field device 10 and a process control system provide outputs representative of sensor signals and inputs representative of other process monitoring and control functions. Process communications utilize a variety of protocols including, but not limited to, standard analog (4-20 mA) protocols, hybrid analog-digital protocols such as HART®, and digital measurement and control protocols such as Fieldbus Foundation™ and PROFI®BUS/PROFI®NET.

Process communications take place over a combination of standard analog wire loops, data buses and other means of data communications. In some embodiments, communications utilize infrared, optical, RF (radio-frequency) and other wireless means of communication, including HART®-based systems such as the 1420 wireless gateway or a wireless device such as a 3051S wireless pressure transmitter, which are available from Rosemount Inc. of Chanhassen Minn., an Emerson Process Management company. The LOI assembly typically comprises a visual display, audio alarm and other elements that provide some of the same functionality as the I/O interface, but are adapted for local rather than remote access.

Note that the configuration of FIG. 1 is merely representative, and the individual components of both magnetic flowmeter 10 and transmitter 11 vary from embodiment to embodiment. As shown in FIG. 1, for example, magnetic flowmeter 10 comprises a particular 8700-series magnetic flowmeter from Rosemount Inc., with transmitter 11 in an integrated or direct-mounted configuration. In other embodiments transmitter 11 is remotely mounted, as described above. In further embodiments flowmeter 10 represents a different Rosemount 8700-series magnetic flowmeter, or a magnetic flowmeter from a different series or different commercial vendor. Alternatively, flowmeter 10 represents a custom-designed magnetic flowmeter.

FIG. 2 is a schematic end view of magnetic flowmeter 10. Magnetic flowmeter 10 comprises flowmeter body 13 and pipe section 14. Flowmeter body 13 houses coils 15 and probe electrodes 16 with electrode covers 18. Pipe section 14 (shown with diagonal lines) is lined with protective liner 26 to form the process flow channel (or conduit) through magnetic flowmeter 10.

Pipe section 14 and the process flow channel (or process flow conduit) are shown end-on in this view, with the process fluid flow directed into the page and through magnetic field B, as provided by coils 15. The flangeless process coupling is not shown in FIG. 2.

Coils 15 are electromagnets configured to generate a magnetic field from an energizing current. In typical embodiments, coils 15 comprise a number of conducting windings that provide a reversible AC or DC magnetic field inside pipe section 14. In some embodiments, coils 15 also comprise a soft iron core to increase or modify the magnetic field flux. In particular, coils 15 are configured to carry sufficient current to generate a magnetic field that is substantially larger in magnitude than typical background fields, which are on the order of about five gauss (5 G, or 0.5 mT) or less.

Magnetic field B is typically oriented across pipe section 14, perpendicular to the process flow. A Faraday loop forms across electrodes 16, which are usually oriented perpendicularly to the direction of flow through magnetic field B.

Coils 15 are designed to produce a relatively uniform field inside pipe section 14, but the particular structure of field lines in FIG. 2 is merely representative. In some embodiments, meter housing 13 also comprises magnetically soft return or yoke structures to modify the field structure. These elements reduce fringing fields by providing a flux return path inside housing/meter body 13, but this is not shown in FIG. 2.

Probe electrodes 16 are manufactured from a corrosion-resistant and erosion-resistant material. The particular composition typically depends upon the properties of the process flow, and is selected to increase service life and reliability. In various embodiments, electrodes 16 comprise a number of metals and metal alloys including, but not limited to, stainless steels such as 266 SST, tantalum, platinum, titanium, and Hastelloy® or other specialty alloys, as available from Rosemount Inc. or other commercial vendors including Hanes International of Kokomo, Ind.

Probe 16 comprises at least two electrodes for sensing or detecting an induced voltage across the flow channel inside pipe section 14. Typically, the probe electrodes are located on opposite sides of the flow channel, extending through pipe section 14 and insulating liner 26 to make direct electrical contact with the process fluid. Probe electrodes 16 complete a Faraday loop through the process fluid, sensing the induced voltage to generate a signal that characterizes the process fluid flow rate through magnetic field B.

Protective liner 26 lines flow pipe section 14 to insulate flowmeter 10 from the process fluid flow. Protective liner 26 provides an electrical, chemical, and mechanical barrier between pipe section 14 and the process flow. Liner 26 insulates pipe section 14 from electrical contact with the process flow, and protects from erosion or corrosion due to chemicals or abrasives in the process fluid.

In one embodiment, protective liner 26 is comprised of polyurethane or another nonmagnetic, insulating polymer, with a thickness of approximately 0.188 inches (about 4.8 mm). The composition of liner 26 varies, however, depending upon the properties of the process fluid flow. In other embodiments, protective liner 26 is comprised of Teflon®, Tefzel®, Neoprene, natural rubber, Ryton® PPS, or another durable, insulating, protective polymer, as available from Rosemount Inc., DuPont and Company of Wilmington, Del., Chevron Phillips Chemical of The Woodlands, Tex., and other commercial vendors.

The thickness of liner 26 also varies. For pipe sections ranging from two inches to a foot or so in diameter (2-12", or about 5-30 cm), the thickness varies from about a tenth of an inch or less (0.10", or about 2.5 mm) to about one-quarter inch or more (0.25", or about 6.4 mm). For smaller-scale and larger-scale embodiments, the thickness of liner 26 typically scales with the dimensions of pipe section 14, although the scaling is not strictly linear.

Electronics assembly 22 comprises a current or voltage source (CS) to energize coils 15, and a signal and control processor (µP) to control the coil current and to process the induced voltage signal from probe electrodes 16. FIG. 2 shows voltage source CS and processor µP in schematic form, to illustrate signal processing and coil current connections to magnetic flowmeter 10. FIG. 2 does not include other elements of electronics assembly 22 and transmitter 11, which are described above with respect to FIG. 1.

Current/voltage source CS provides an energizing current to coils 15 via coil drive wires Coil-0 (C0) and Coil-1 (C1). Coils 15 generate magnetic field B in response to the drive current. Over a wide operational range, the field strength is approximately proportional to the current.

In typical embodiments, two coils 15 are "daisy chained" or connected in series via a return wire connection such as Coil-R. In these embodiments, each coil carries the same current and contributes approximately equally to the overall field strength. In other embodiments the number of coils varies, and current/voltage source CS sometimes provides individual drive current connections to each coil element.

Magnetic flowmeter 10 produces a voltage signal that is substantially proportional to the average velocity or flow rate of process fluid through the process flow channel. As the (conducting) fluid passes through magnetic field B, a potential is induced across probe electrodes 16 according to Faraday's Law of electromagnetic induction. Electronics assembly 22 samples the induced voltage signal via signal wires Probe-0 (P0) and Probe-1 (P1), and processes the signal to measure the flow rate.

More specifically, induced potential E is proportional to (average) flow velocity V, (average) magnetic field strength B, and diameter D of the flow pipe (typically, the diameter is approximately equal to the electrode spacing). That is, $$E = kBDV, \quad [1]$$

where k is a proportionality constant that depends upon the units in which E, B, D and V are measured.

Thus the process flow velocity is a function of the induced potential, the magnetic field strength, and the diameter across the process flow:

$$V = \frac{E}{kBD}. \quad [2]$$

That is, (average) process flow velocity V is directly proportional to induced potential signal E, and indirectly proportional to (average) magnetic field strength B and diameter D, as measured across the conducting flow.

In some embodiments, electronics assembly 22 is configured for pulsed DC (direct-current) magnetic flow measurements. In these embodiments, transmitter 11 varies or modulates the coil current to reduce signal noise. Specifically, electronics assembly 22 modulates the energizing current supplied to coils 15 as a function of time, producing a low-frequency, controlled-amplitude square wave. The energizing current varies between a high value and a low value, and the induced voltage is measured (sampled) at each. The flow signal (as characterized by induced potential E) is a matching square wave with amplitude proportional to flow velocity V.

Pulsed-DC measurements reduce the effect of a number of noise sources including, but not limited to, electrolytic reactions between the process fluid and probe electrodes 16, capacitive couplings between coils 15 and external electrical systems, stray voltage and current loops, and phase shifting due to impedance in the process fluid. As compared to AC-modulated (alternating current) systems, pulsed DC systems also reduce quadrature voltage effects, including the effects of inductive couplings between magnetic field B, the process fluid and electrical connections between probe electrodes 16 and signal processor µP.

Pulsed DC embodiments also reduce the need to compensate for AC voltage and frequency variations, including variations on standard AC power lines. Signal noise is further reduced by making the modulation frequency a multiple of the AC line frequency and the sampling period approximately equal to a power cycle (or an integer multiple thereof). This allows the coil drive wires and signal wires to employ standard cables and share a single conduit, even in relatively distant remote transmitter installations.

Figure 3:
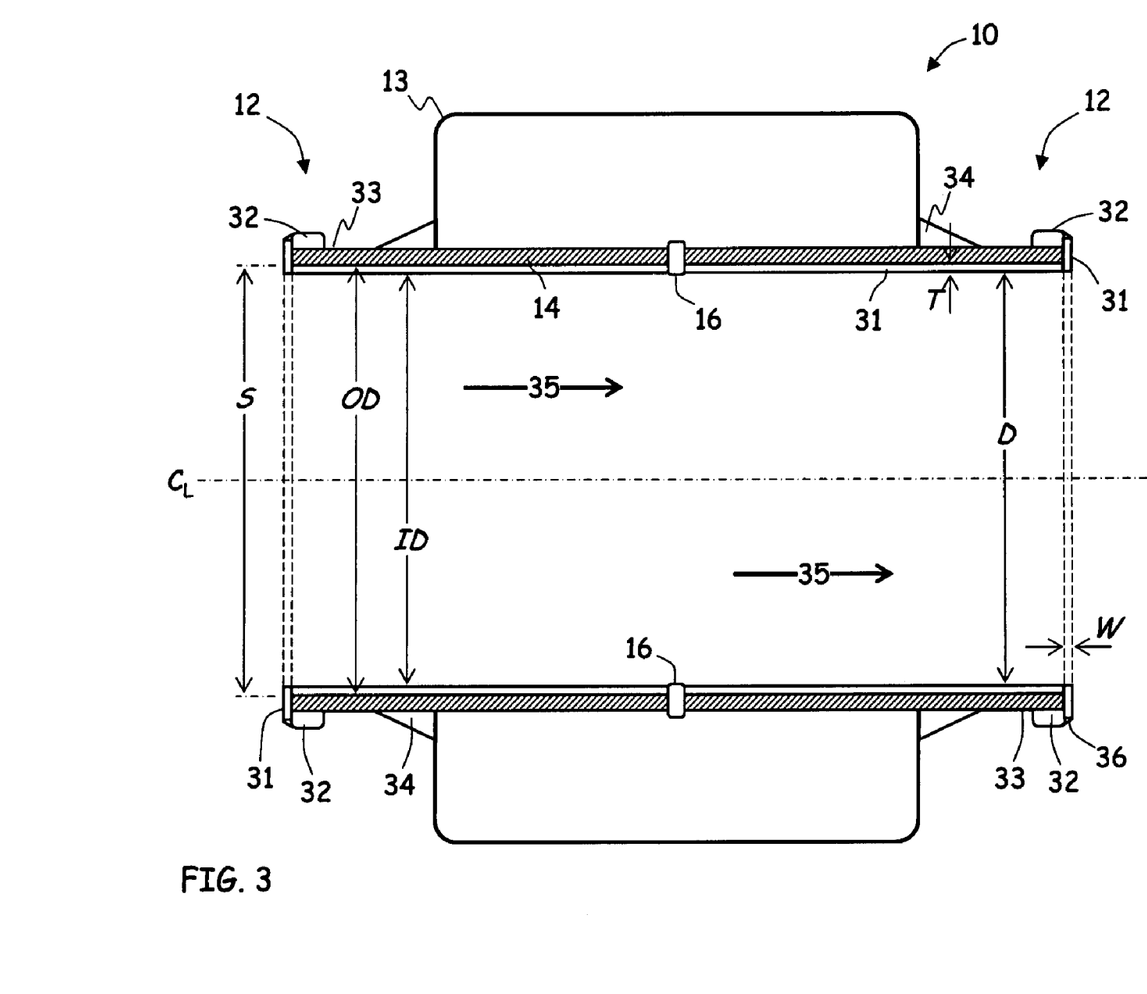
FIG. 3 is a cross-sectional schematic showing a flangeless process coupling and integrated liner protector for the magnetic flowmeter of FIG. 1.

FIG. 3 is a cross-sectional schematic showing flangeless process coupling 12 with integrated liner protector 31. Flangeless process coupling 12 comprises integrated liner protector 31 to protect liner 26 from the process flow, retention elements (coupling elements) 32 and 33, and transition 34. In the particular embodiment of FIG. 3, flangeless process coupling 12 is provided on both ends of pipe section 14 (shown with diagonal lines), but in various other embodiments coupling structure 12 is provided on only one or the other end.

Protective liner 26 provides an electrically insulating layer and a chemical and mechanical protective barrier for pipe section 14, as described above. Typically, protective liner 26 is a cylindrical element with an annular cross section, which conforms to the inside of pipe section 14. As shown in FIG. 3, for example, protective liner 26 has outside diameter OD approximately equal to an inside diameter of pipe section 14, and inside diameter ID that defines diameter D of process flow channel 35. Thickness T of protective liner 26 is half the difference between the inside and outside diameters; that is, $T=\frac{1}{2}(OD-ID)$.

In one embodiment, liner 26 is comprised of polyurethane and has OD of approximately eight inches (8.000", or about 30 cm), corresponding to an 8" (30 cm) pipe section, with thickness T of about 0.188 inches (0.188", or about 4.78 mm). In other embodiments the thickness of liner 26 varies, generally scaling with the dimension of pipe section 14 as described above.

Integrated liner protector 31 is typically manufactured from a durable metal such as stainless steel, copper, or a durable metal alloy. Liner protector 31 is usually nonmagnetic, for the same reasons as pipe section 14 and meter body 13, and in some embodiments liner protector 31 is manufactured of the same material as pipe section 14. In particular, some embodiments require that liner protector 31 not be manufactured from rolled steel or other magnetic material, as was the practice in previous designs.

Embodiments in which liner protector 31, pipe section 14 and retention elements 32 and 33 are formed of the same material provide both liner protector 31 and pipe section 14 with the same magnetic and electrochemical properties, improving control of the magnetic field structure and preventing electrochemical effects due to the mating or welding of two different materials.

For round pipe applications, liner protector 31 has an annular structure and abuts an end of protective liner 26 at flangeless process coupling 12. As shown in FIG. 3, liner protector 31 has an inner diameter ID that is equal to the inner diameter of liner 26, in order to protect liner 26 from high-pressure, high-volume process flows of an abrasive and corrosive nature.

Liner protector 31 forms an end seal against liner 26, where the seal has the same inside diameter as the liner. This prevents the intrusion of process flow between liner 26 and pipe section 14, even at high pressures and high flow rates characteristic of hydraulic fracturing applications, as described below. Liner protector 31 also mechanically retains protective liner 26 within meter body 14, and provides mechanical protection against abrasive and corrosive flows, particularly at the ends of liner 26 where it abuts or contacts liner protector 31. In particular, this prevents particulates in the process flow (or other objects) from "catching" or impacting onto liner protector 31 while passing through the flow channel. Instead, liner protector 31 provides a smooth flow transition between liner protector 31 and liner 26 at the end seal, improving performance and service life.

Typically, liner protector 31 is integrated into flangeless process coupling 12 by mechanical attachment, for example by welding the liner protector to pipe section 14 along weld 36, at an end of the flangeless process coupling structure. Outer diameter S of liner protector 31 varies somewhat, depending upon the particular manufacturing methods used to form flangeless process coupling structure 12 on pipe section 14.

In particular, some manufacturing methods such as milling require the removal of material proximate liner protector 31, and accommodate a smaller outside diameter S. Other manufacturing methods require the addition of material proximate liner protector 31, and accommodate a larger outside diameter S. Width W of liner protector 31 also varies in order to provide substantial service life in high-pressure abrasive and corrosive flows, and to provide cost-effective magnetic flowmeter designs for hydraulic fracturing and other large-scale applications.

In one embodiment, for example, liner protector 31 has width W of approximately one-quarter inch (0.250", or about 6.35 mm), outside diameter OD of about 8.437" (about 21.4 cm), and inside diameter ID of about 7.605" (19.3 cm). In this embodiment, liner protector 31 accommodates an eight-inch (8", or about 20 cm) pipe section for process flow. In other embodiments the dimensions of liner protector 31 generally scale with pipe size, similarly to those of liner 26.

Retention elements 32 and 33 are typically formed by milling or surface machining of pipe section 14. Alternatively, they are formed by welding or other mechanical attachment of additional structures, such as a retention collar or a gasket seat collar, onto the pipe section. As shown in FIG. 3, for example, coupling element 32 comprises a retention collar and gasket seat, and coupling element 33 comprises a retention element formed along one edge of the retention collar/gasket seat. Transition 34 is similarly formed adjacent meter body 13, in order to create a mechanical attachment between pipe section 14, including flangeless process coupling 12, and magnetic flowmeter 10.

As shown in FIG. 3, retention collar 32 with retention element 33 allows flangeless process coupling 12 to accommodate an external coupler for forming an end-to-end fluid connection. In particular, retention collar 32 accommodates an external coupler housing that mechanically attaches magnetic flowmeter 10 to a process flow structure such as a flow pipe, and forms a pressure and fluid seal against a gasket to prevent leakage at the coupling. The end-to-end or straight-pipe process fluid connection does not require an internal gasket or flange with through-hole fasteners, as described below.

The construction of magnetic flowmeter 10 with a flangeless process coupling poses a number of design challenges. In particular, the effects of process fluid flow on protective liner 26 are critical, because erosive and corrosive flows can quickly destroy an unprotected liner. This requires design and fabrication of a built-in (integrated) liner protector, and the fabrication of process coupling 12 to accommodate a sealing abutment between liner protector 31 and protective liner 26.

Protective liner 26 and liner protector 31 are also designed to withstand high pressures, high flow rates, and corrosive and abrasive flows, for which no satisfactory flangeless magnetic flowmeter coupling exists. For example, in hydraulic fracturing applications for liquid and gaseous hydrocarbons (oil and gas extraction), downhole pressures must exceed the fracture gradient of the hydrocarbon-bearing formation. In order to achieve these pressures, flangeless process coupling 12 must withstand minimum process pressures in excess of about 100 psi (about 0.7 MPa). In some embodiments, operating pressures exceed about 1,000 psi (about 7 MPa).

Many process fluids also comprise a corrosive such as hydrochloric acid, in order to dissolve parts of the hydrocarbon-bearing formation, and a solid abrasive proppant such as sand, to maintain hydraulically-induced fractures. Flangeless coupling 12 must also withstand this abrasive or corrosive flow, at minimum rates in excess of one hundred gallons per minute (100 gpm, or about 380 l/min). In some applications the flow rate exceeds 1,000 gpm (about 3,800 l/min).

Figure 4:
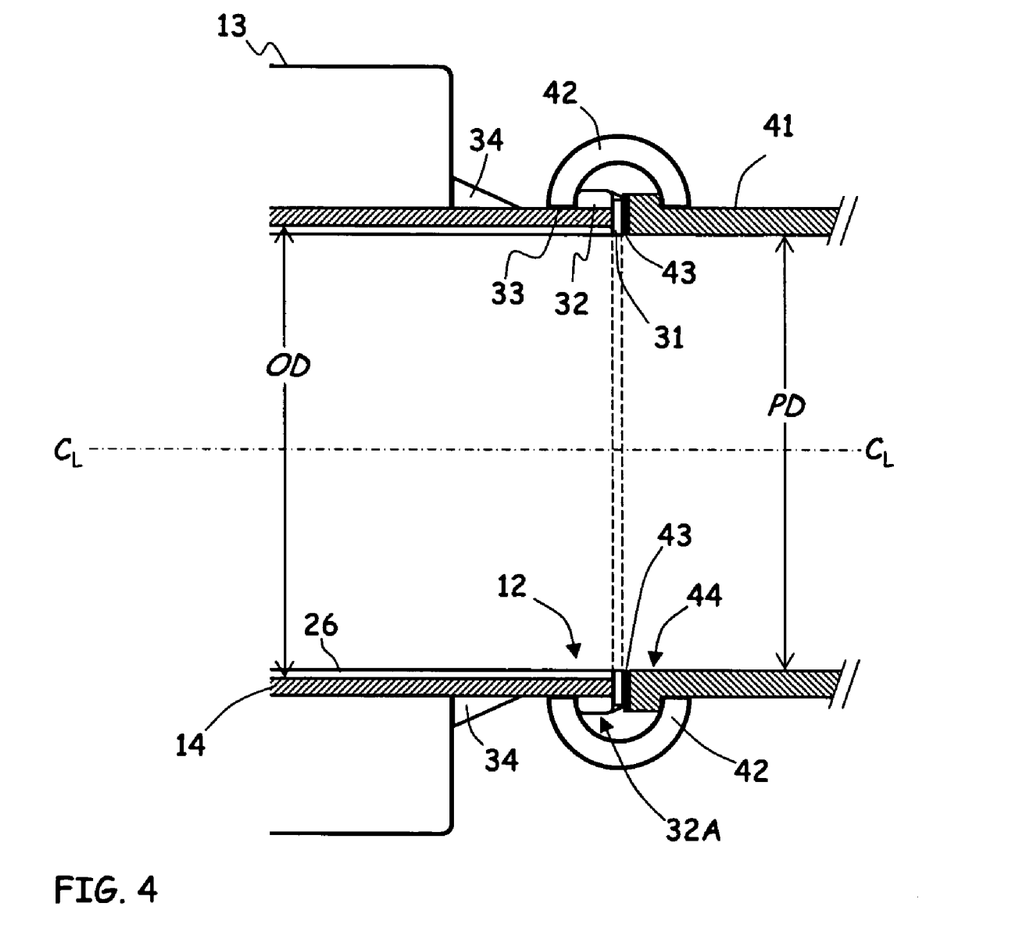
FIG. 4 is a cross-sectional schematic view of the flangeless process coupling in FIG. 3, showing an end-to-end connection to a process flow pipe.

FIG. 4 is a cross-sectional schematic view of flangeless process coupling 12, showing an end-to-end connection to process flow pipe 41. The fluid connection is formed by external coupler 42 and external gasket 43, which form an external end-to-end coupling between pipe section 14 (shown with diagonal lines) and process pipe 41 by mating to flangeless process coupling structure 12.

Process pipe 41 (also shown with diagonal lines) is a process flow structure capable of forming and end-to-end or straight-pipe fluid connection to pipe section 14 via process coupling structure 44 on process pipe 41, which is analogous to flangeless coupling structure 12 on pipe section 14. Process pipe 41 is typically made of steel, stainless steel, copper, aluminum, an abrasion-resistant and corrosion-resistant metal alloy, a durable polymer material such as PVC or ABS plastic, or a combination thereof.

Process pipe 41 has inner process pipe diameter PD. In the embodiment of FIG. 4, inner process pipe diameter PD corresponds approximately to inner liner diameter ID of protective liner 26, reducing entrance effects and liner abrasion. In alternate embodiments, inner process pipe diameter PD corresponds approximately to outer diameter OD of protective liner 26, such that process pipe 41 and pipe section 14 have the same inner diameter (see, e.g., FIG. 5). The relationship between process pipe diameter PD and inner liner diameter ID is independent of the coupling configuration, and the coupling configuration is not limited to any particular relationship among diameters of the process pipe, liner, and pipe section. In further embodiments, for example, inner process pipe diameter PD and outer diameter OD of protective liner 26 vary arbitrarily with respect to one another, and coupling structure 44 comprises adapter elements to expand or reduce the diameter of process pipe 41, in order to conform to various dimensions of coupling elements on flangeless process coupling 12.

External coupler 42 is an annular structure comprised of a ductile iron, copper or another malleable metal or metal alloy, or a rigid metal such as stainless steel. Alternatively, external coupler 42 is formed of a durable polymer material. In some embodiments, external coupler 42 is referred to as a housing, and in other embodiments external coupler 42 is referred to as an external collar or ring.

Figure 5:
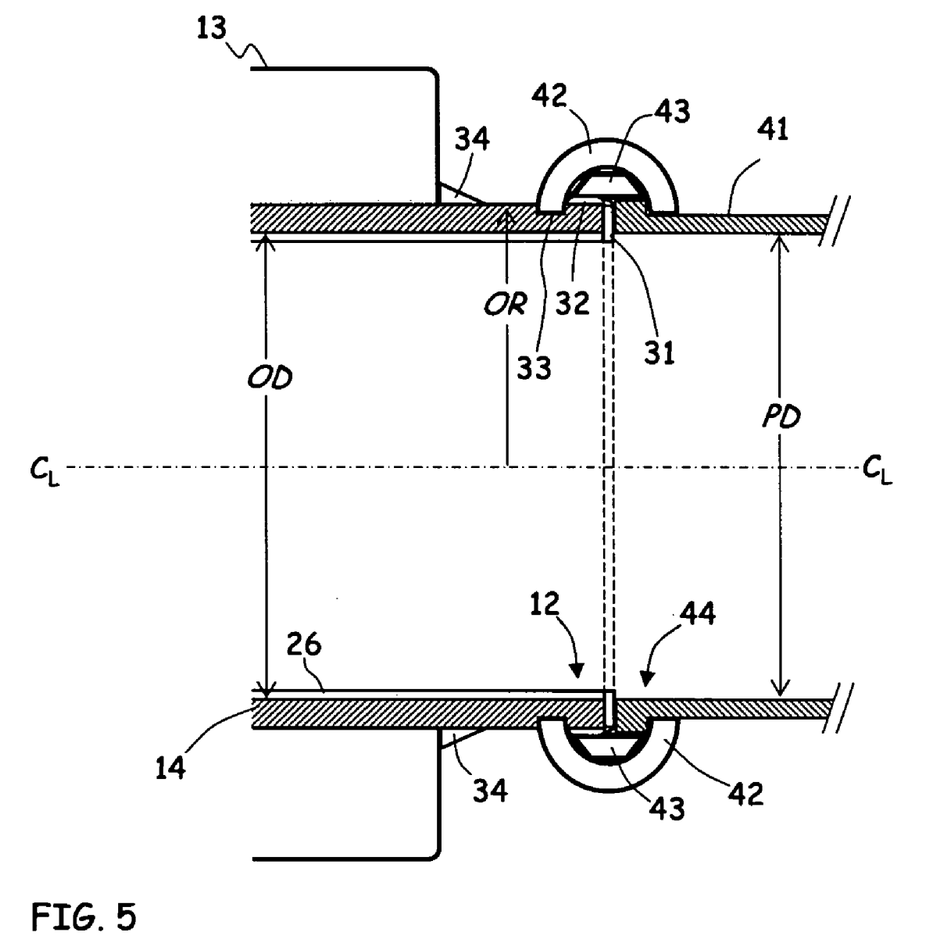
FIG. 5 is a cross-sectional schematic view of the flangeless process coupling in FIG. 3, showing an alternate end-to-end connection to a process flow pipe.

Coupling gasket 43 is comprised of a metal or a flexible polymer such as EPDM (ethylene propylene diene monomer), EPDM rubber, nitrile, nitrile rubber, which is selected for flexibility and resistance to chemical and abrasive effects from the process fluid flow. In some embodiments, coupling gasket 43 is an internal coupling gasket, as shown in FIG. 4, and in other embodiments coupling gasket 43 is an external coupling gasket, as shown in FIG. 5.

Coupling gasket 43 is typically manufactured as a unitary or one-piece annular structure, in order to form a pressure and fluid seal around an end of pipe section 14 at flangeless process coupling 12, and around an end of process pipe 41 at analogous coupling structure 44. External coupler 42 is generally formed in two or more parts that create an annular housing or external retention collar around retention elements 32 and 33, and gasket 43.

The parts of external coupler housing 42 are fastened together via bolts, screws, or other mechanical fastening devices (not shown). This compresses the gasket onto gasket seat/retention collar 32, and positions one side of external coupler 42 at retention element 33, which is located at one side of retention collar 32. The other side of external coupler 42 is positioned at coupling structure 44, which provides analogous structures to prevent mechanical separation and provide an additional process seal.

External coupler 42 and gasket 43 work in cooperation with flangeless process coupling 12 to provide a pressure and fluid seal, and also to form a mechanical attachment between pipe section 14 and process pipe 41. Specifically, the mechanical fasteners are used to tighten the parts of external collar/housing 42, compressing gasket 43 against liner protector 31 and positioning one side of external coupler 42 at retention element 33, with gasket 43 forming a pressure and fluid seal against liner protector 31.

As shown in FIG. 4, retention collar 32 is substantially annular and has external surface 32A that is parallel to axial centerline $C_L$. In this embodiment, flangeless coupling structure 12 comprises an integrated retention collar, gasket seat and liner protector, where retention elements 32 and 33 form a combined coupling collar. Liner protector 31 provides the (internal) gasket seat for coupling element 32, forming an internal seal against gasket 43.

In alternate embodiments, retention collar 32 is slanted, wedge-shaped, indented, extended or has another shape, in order to accommodate different cross-sectional geometries for external coupler 42 and gasket 43. Similarly, in various embodiments the gasket seat and retention element exhibit a rectangular cross-section (as shown in FIG. 4), or a semicircular, arcuate, vee-shaped, grooved, slotted, wedge-shaped or other cross sectional geometry, and both the gasket seat and retention element exhibit various depths and widths to accommodate a range of different external couplers 42 and internal or external gaskets 43.

In contrast to the external gasket embodiment of FIG. 5, below, the embodiment of FIG. 4 forms a direct external coupling between external coupler 42 and flangeless coupling 12, without an external gasket. Instead, gasket 43 is internal, and forms an internal fluid and pressure seal against gasket seat/retention collar 32 via liner protector 31. FIG. 4 also illustrates that flangeless coupling structure accommodates metal-on-metal connections, such as Grayloc®-type connections, in which both external coupler 42 and gasket 43 are manufactured of a metal or metal alloy. Alternatively, these elements are comprised of a durable polymer, with both metal and polymer classes including those compositions described above for the other elements of flowmeter 10 and the external couplers.

FIG. 5 is a cross-sectional schematic view of flangeless process coupling 12, showing an alternate end-to-end connection to process flow pipe 41. In this embodiment, the fluid connection is formed by external coupler 42 and external gasket 43, which form an external end-to-end coupling between pipe section 14 and process pipe 41 by mating to flangeless process coupling 12, with an external end-to-end gasket seal.

More specifically, flangeless coupling structure 12 comprises a combined or integrated retention collar, gasket seat and liner protector, in which coupling element 32 provides an external gasket seat and coupling element 33 provides a coupling groove for retaining external coupler 42. In general, the coupling groove has an outer radius that is less than outer radius OR of pipe section 14, where the outer radius of pipe section 14 is measured between retention element 33 and transition 15. In contrast, the retention collar has an outer radius that is as great as, or greater than, outer radius OR of pipe section 14.

In some embodiments, the gasket seat and retention element accommodate a Victaulic®-type external coupler 42 and external gasket 43, with associated mechanical fasters. These couplers are commercially available in a wide variety of sizes and configurations, from the Victaulic Company of Easton, Pa. In other embodiments, flangeless process coupling 12 is configured for different external coupler/gasket and mechanical fastener designs, as available from a number of other commercial vendors.

FIGS. 4 and 5 illustrate that flangeless coupling device 12 is configurable for a wide range of different end-to-end and external coupling geometries, including both internal and external gasket seals. In particular, the retention elements (or coupling element) are configurable for a wide range of retention groove, retention slot, retention ring, retention collar and other retention geometries, and an equally wide range of internal and external gasket geometries. These include both metal-on-polymer coupling surfaces and metal-on-metal coupling surfaces.

In contrast to previously-existing high-pressure, high-flow coupling structures that form flanged or face-to-face fluid seals, the end-to-end or straight-pipe connections illustrated in FIGS. 4 and 5 do not require through-hole flange fasteners. Flangeless coupling 12 is thus boltless; that is, no mechanical fasteners extend through holes in any element of coupling 12. Mechanical fasteners are used to compress external coupler 42 around pipe section 14 and process flow pipe 41, but these do not physically extend through or across the fluid connection at coupling 12.

Further, flangeless process coupling 12 does not require a flange gasket that forms a face-to-face seal between opposing flanges. Instead, flangeless process coupling 12 employs a flangeless gasket that forms a seal against gasket seat 32 when compressed by external coupler 42. In contrast to traditional lower-pressure fluid couplings, external process coupling 12 is also threadless; that is, there are no threads involved in the pressure or fluid seal itself, although they are generally used on the external mechanical fasteners.

These designs have significant advantages for magnetic flowmeter applications. In particular, flangeless process coupling 12 with liner protector 31, gasket seat 32 and retention element 33 is adaptable to both rigid and flexible process fluid connections. The former design allows the magnetic flowmeter a limited range of motion with respect to process pipe 41, in order to accommodate flexing or reduce seismic stresses. The latter design reduces relative motion and reduces the range of mechanical vibrations.

Flangeless process coupling 12 also provides for easier alignment than flanged and through-bolted designs. In particular, external coupler housing 42 completes the alignment of structure 12 with process pipe 41 during formation of the coupling (that is, while tightening the mechanical fasteners), rather than requiring more complete alignment before inserting through-hole bolts or other mechanical fasteners into a flange or other sealing structure. Flangeless process coupling 12 thus facilitates faster, easier maintenance and lowers overall operating costs, by reducing the need for specialized adaptor hardware and decreasing installation length requirements, increasing the range of possible magnetic flowmeter installations without requiring substantial modification to existing fluid processing structures.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. A magnetic flowmeter body comprising:
   a pipe section;
   an insulating polymer liner lining the pipe section to form a process flow channel;
   a flangeless retention collar located on an end of the pipe section for forming an end-to-end fluid connection to the process flow channel;
   a liner protector formed on the retention collar to provide an end seal for the insulating polymer liner, wherein the end seal is formed by contact between the liner protector and an annular end of the insulating polymer liner;
   a coil for generating a magnetic field inside the process flow channel; and
   an electromotive force sensor for sensing an electromotive force generated by fluid flow through the magnetic field inside the process flow channel;
   wherein the retention collar and the liner protector are formed of nonmagnetic metal.

2. The body of claim 1, wherein the pipe section is formed of nonmagnetic metal.

3. The body of claim 2, wherein the nonmagnetic metal is the same for each of the pipe section, the retention collar and the liner protector.

4. The body of claim 1, wherein the liner protector and the insulating polymer liner have an equal inside diameter.

5. The body of claim 1, wherein the retention collar forms the end-to-end process fluid connection in cooperation with an external coupler compressed around the pipe section and the retention collar.

6. The body of claim 5, wherein the retention collar comprises an external gasket seat for forming a process fluid seal in cooperation with an external gasket, such that the external coupler forms the process fluid seal by compressing the external gasket around the retention collar.

7. The body of claim 5, wherein the liner protector comprises an internal gasket seat for forming a process fluid seal in cooperation with an internal gasket, such that the external coupler forms the process fluid seal by compressing the internal gasket onto the liner protector.

8. The body of claim 5, wherein the retention collar has an outside radius that is greater than an outside radius of the pipe section.

9. The body of claim 5, further comprising a coupling groove for positioning the external coupler, wherein the coupling groove has an outside radius that is less than an outside radius of the pipe section.

10. The body of claim 1, further comprising a signal processor for producing an output representative of the fluid flow through the process channel based upon the electromotive force generated by the fluid flow through the magnetic field.

11. The body of claim 10, further comprising a transmitter for energizing the coil to create the magnetic field and for measuring a flow rate in the flow channel as a function of the electromotive force.

12. A magnetic flowmeter comprising:
a meter body comprising a pipe section extending through the meter body, an insulating polymer liner lining the pipe section, a probe extending though the insulating polymer liner, and a coil for generating a magnetic field inside pipe section; and
a flangeless coupling structure comprising an annular retention element formed onto an end of the pipe section and an annular liner protector formed onto the retention element, wherein the liner protector and the retention element are formed of nonmagnetic metal, and wherein the liner protector forms an end seal on the insulating polymer liner by contact between the liner protector and an annular end of the insulating polymer liner.

13. The flowmeter of claim 12, wherein the nonmagnetic metal forming the liner protector and the retention element comprises a stainless steel.

14. The flowmeter of claim 13, wherein the liner protector and the insulating polymer liner have an equal inner diameter.

15. The flowmeter of claim 12, wherein the retention element comprises an external gasket seat for forming a process fluid seal with an external gasket, and wherein the retention element forms the process fluid seal in cooperation with an external coupler compressed around the pipe section and the retention element, such that the external coupler compresses the external gasket around the retention element.

16. The flowmeter of claim 12, wherein the liner protector comprises an internal gasket seat for forming a process fluid seal with an internal gasket, and wherein the retention element forms the process fluid seal in cooperation with an external coupler compressed around the pipe section and the retention element, such that the external coupler compresses the internal gasket onto the liner protector.

17. The flowmeter of claim 13, wherein the retention element has an outside radius larger than an outside radius of the pipe section.

18. The flowmeter of claim 13, wherein the retention element has an outside radius smaller than an outside radius of the pipe section.

19. The flowmeter of claim 12, further comprising a current source for energizing the coil and a signal processor for producing an output representative of fluid flow through the flowmeter, wherein the output is a function of a voltage signal produced by the probe.

20. The flowmeter of claim 19, wherein the function of the voltage signal comprises a DC modulated function of the magnetic field.

21. A magnetic flowmeter comprising:
a meter body;
a pipe section extending through the meter body;
an insulating liner lining the pipe section and forming a flow channel therein;
two sensors extending through the pipe section and the insulating liner to the flow channel;
an annular retention element formed on an end of the pipe section; and
an annular liner protector formed on the annular retention element;
wherein the annular liner protector forms an end seal on the insulating liner by contact between the annular liner protector and the insulating liner; and
wherein the insulating liner is formed of a polymer and the annular liner protector and the annular retention element are formed of a nonmagnetic metal.

22. The flowmeter of claim 21, wherein the annular retention element forms an end-to-end process fluid seal in cooperation with an external coupler compressed around the pipe section and the annular retention element.

23. The flowmeter of claim 22, wherein the annular retention element comprises an external gasket seat for forming the process fluid seal, and wherein the external coupler forms the process fluid seal by compressing an external gasket around the retention collar and onto the external gasket seat.

24. The flowmeter of claim 22, wherein the annular liner protector comprises an internal gasket seat for forming the process fluid seal, and wherein the external coupler forms the process fluid seal by compressing an internal gasket onto the annular liner protector and the internal gasket seat.

25. The flowmeter of claim 21, further comprising:
a coil for generating a magnetic field in the flow channel;
a current source for energizing the coil; and
a signal processor for producing an output representative of fluid flow through the flow channel based on an electromotive force generated across the sensors by the magnetic field.

* * * * *

UNITED STATES PATENT AND TRADEMARK OFFICE
CERTIFICATE OF CORRECTION

PATENT NO.       : 7,637,169 B2                       Page 1 of 1
APPLICATION NO.  : 12/082456
DATED            : December 29, 2009
INVENTOR(S)      : Bret Allen Shanahan et al.

It is certified that error appears in the above-identified patent and that said Letters Patent is hereby corrected as shown below:

Title Page, Item (73), Assignee
        Delete "Rosemount, Inc."
        Insert --Rosemount Inc.--

Col. 13, Line 17
        Delete "though"
        insert --through--

Signed and Sealed this
Seventh Day of June, 2011

David J. Kappos
*Director of the United States Patent and Trademark Office*